United States Patent
Vargo et al.

(10) Patent No.: US 8,933,791 B2
(45) Date of Patent: *Jan. 13, 2015

(54) METHOD AND SYSTEM FOR CORRECTLY IDENTIFYING SPECIFIC RFID TAGS

(71) Applicant: Vocollect, Inc., Pittsburgh, PA (US)

(72) Inventors: Rob Vargo, Monroeville, PA (US); Ryan Zoschg, Pittsburgh, PA (US); Edward Charles Borgoyn, Monroeville, PA (US); Mike Naughton, Oakmont, PA (US)

(73) Assignee: Vocollect, Inc., Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/188,312

(22) Filed: Feb. 24, 2014

(65) Prior Publication Data

US 2014/0166754 A1 Jun. 19, 2014

Related U.S. Application Data

(63) Continuation of application No. 12/841,798, filed on Jul. 22, 2010, now Pat. No. 8,659,397.

(51) Int. Cl.
*H04Q 5/22* (2006.01)
*G06K 7/10* (2006.01)
(Continued)

(52) U.S. Cl.
CPC .......... *G06K 7/10297* (2013.01); *G06K 7/0008* (2013.01); *G06K 7/10079* (2013.01); *G06K 7/10128* (2013.01); *G06Q 10/087* (2013.01)
USPC ... 340/10.4; 340/10.1; 340/572.1; 340/572.4; 235/375; 235/385

(58) Field of Classification Search
CPC .......................... G06K 7/0008; G06K 7/10128
USPC .......... 340/10.1, 10.4, 572.1, 572.4; 235/375, 235/385
See application file for complete search history.

(56) References Cited

U.S. PATENT DOCUMENTS

| 1,483,315 A | 2/1924 | Saal |
| 1,753,317 A | 4/1930 | Rothen |
| 2,170,287 A | 8/1939 | Kinnebrew |

(Continued)

FOREIGN PATENT DOCUMENTS

| DE | 41 38 886 C1 | 4/1993 |
| EP | 0 732 817 A2 | 9/1996 |

(Continued)

OTHER PUBLICATIONS

Nov. 7, 2011 Search Report issued in International Patent Application No. PCT/US2011/043854.

*Primary Examiner* — Andrew Bee
(74) *Attorney, Agent, or Firm* — Oliff PLC; R. Brian Drozd

(57) ABSTRACT

A system and method for identifying a specific RFID tag includes RFID reader circuitry, such as within an RFID reader, configured for sending and receiving RF signals to detect RFID tags and for obtaining signal parameter information associated with the RFID tags. Processing circuitry is configured for using the signal parameter information for one or more tags of the RFID tags and calculating a tag score for the one or more RFID tags. The processing circuitry is further configured for determining a specific RFID tag using the tag scores for the one or more RFID tags.

20 Claims, 4 Drawing Sheets

(51) Int. Cl.
*G06K 7/00* (2006.01)
*G06Q 10/08* (2012.01)

(56) References Cited

U.S. PATENT DOCUMENTS

| | | | |
|---|---|---|---|
| 2,369,860 A | 2/1945 | Schroeder |
| 2,506,524 A | 5/1950 | Stuck |
| 2,782,423 A | 2/1957 | Simon et al. |
| 2,958,769 A | 11/1960 | Bounds |
| 3,087,028 A | 4/1963 | Bonnin |
| 3,327,807 A | 6/1967 | Mullin |
| 3,363,214 A | 1/1968 | Wright |
| 3,654,406 A | 4/1972 | Reinthaler |
| 3,682,268 A | 8/1972 | Gorike |
| 3,781,039 A | 12/1973 | Locke et al. |
| 3,808,577 A | 4/1974 | Mathauser |
| 3,873,757 A | 3/1975 | Berke et al. |
| 3,969,796 A | 7/1976 | Hodsdon et al. |
| 3,971,900 A | 7/1976 | Foley |
| 3,971,901 A | 7/1976 | Foley |
| 3,984,885 A | 10/1976 | Yoshimura et al. |
| 4,010,998 A | 3/1977 | Tolnar, Jr. et al. |
| 4,018,599 A | 4/1977 | Hill et al. |
| 4,024,368 A | 5/1977 | Shattuck |
| 4,031,295 A | 6/1977 | Rigazio |
| 4,039,765 A | 8/1977 | Tichy et al. |
| 4,049,913 A | 9/1977 | Sakoe |
| 4,068,913 A | 1/1978 | Stanger et al. |
| 4,138,598 A | 2/1979 | Cech |
| 4,189,788 A | 2/1980 | Schenke et al. |
| 4,213,253 A | 7/1980 | Gudelis et al. |
| RE30,662 E | 6/1981 | Foley |
| 4,302,635 A | 11/1981 | Jacobsen et al. |
| 4,418,248 A | 11/1983 | Mathis |
| 4,471,496 A | 9/1984 | Gardner, Jr. et al. |
| 4,472,607 A | 9/1984 | Houng |
| 4,495,646 A | 1/1985 | Gharachorloo |
| 4,499,593 A | 2/1985 | Antle |
| 4,619,491 A | 10/1986 | Drogo |
| 4,620,760 A | 11/1986 | Duncan |
| 4,634,816 A | 1/1987 | O'Malley et al. |
| 4,649,332 A | 3/1987 | Bell |
| 4,672,672 A | 6/1987 | Eggert et al. |
| 4,689,822 A | 8/1987 | Houng |
| 4,698,717 A | 10/1987 | Scheid |
| 4,739,328 A | 4/1988 | Koelle et al. |
| 4,811,243 A | 3/1989 | Racine |
| 4,821,318 A | 4/1989 | Wu |
| 4,845,650 A | 7/1989 | Meade et al. |
| 4,846,714 A | 7/1989 | Welsby et al. |
| 4,864,158 A | 9/1989 | Koelle et al. |
| 4,874,316 A | 10/1989 | Kamon et al. |
| 4,875,233 A | 10/1989 | Derhaag et al. |
| 4,888,591 A | 12/1989 | Landt et al. |
| 4,907,266 A | 3/1990 | Chen |
| 4,914,704 A | 4/1990 | Cole et al. |
| 4,952,024 A | 8/1990 | Gale |
| 4,999,636 A | 3/1991 | Landt et al. |
| 5,003,589 A | 3/1991 | Chen |
| 5,010,495 A | 4/1991 | Willetts |
| 5,012,511 A | 4/1991 | Hanle et al. |
| 5,018,599 A | 5/1991 | Dohi et al. |
| 5,023,824 A | 6/1991 | Chadima, Jr. et al. |
| 5,024,604 A | 6/1991 | Savin et al. |
| 5,028,083 A | 7/1991 | Mischenko |
| 5,030,807 A | 7/1991 | Landt et al. |
| 5,055,659 A | 10/1991 | Hendrick et al. |
| 5,056,161 A | 10/1991 | Breen |
| 5,063,600 A | 11/1991 | Norwood |
| 5,148,155 A | 9/1992 | Martin et al. |
| 5,155,659 A | 10/1992 | Kunert |
| 5,177,784 A | 1/1993 | Hu et al. |
| 5,179,736 A | 1/1993 | Scanlon |
| 5,197,332 A | 3/1993 | Shennib |
| 5,202,197 A | 4/1993 | Ansell et al. |
| 5,208,449 A | 5/1993 | Eastman et al. |
| 5,225,293 A | 7/1993 | Mitchell et al. |
| 5,241,488 A | 8/1993 | Chadima, Jr. et al. |
| 5,251,105 A | 10/1993 | Kobayashi et al. |
| 5,267,181 A | 11/1993 | George |
| 5,280,159 A | 1/1994 | Schultz et al. |
| 5,305,244 A | 4/1994 | Newman et al. |
| 5,309,359 A | 5/1994 | Katz et al. |
| 5,347,477 A | 9/1994 | Lee |
| 5,357,596 A | 10/1994 | Takebayashi et al. |
| 5,365,050 A | 11/1994 | Worthington et al. |
| 5,365,434 A | 11/1994 | Figliuzzi |
| 5,369,857 A | 12/1994 | Sacherman et al. |
| 5,371,679 A | 12/1994 | Abe et al. |
| 5,381,486 A | 1/1995 | Ludeke et al. |
| 5,386,494 A | 1/1995 | White |
| 5,389,917 A | 2/1995 | LaManna et al. |
| 5,393,239 A | 2/1995 | Ursich |
| 5,399,102 A | 3/1995 | Devine |
| 5,406,037 A | 4/1995 | Nageno et al. |
| 5,410,141 A | 4/1995 | Koenck et al. |
| 5,432,510 A | 7/1995 | Matthews |
| 5,438,626 A | 8/1995 | Neuman et al. |
| 5,438,698 A | 8/1995 | Burton et al. |
| 5,446,788 A | 8/1995 | Lucey et al. |
| 5,456,611 A | 10/1995 | Henry et al. |
| 5,462,452 A | 10/1995 | Devine |
| 5,469,505 A | 11/1995 | Gattey et al. |
| 5,478,252 A | 12/1995 | Lecomte et al. |
| 5,479,001 A | 12/1995 | Kumar |
| 5,480,313 A | 1/1996 | d'Alayer de Costemore d'Arc |
| 5,481,645 A | 1/1996 | Bertino et al. |
| 5,491,651 A | 2/1996 | Janik |
| 5,501,571 A | 3/1996 | Van Durrett et al. |
| 5,504,485 A | 4/1996 | Landt et al. |
| 5,510,795 A | 4/1996 | Koelle |
| 5,514,861 A | 5/1996 | Swartz et al. |
| 5,515,303 A | 5/1996 | Cargin, Jr. et al. |
| 5,521,601 A | 5/1996 | Kandlur et al. |
| 5,535,437 A | 7/1996 | Karl et al. |
| 5,550,547 A | 8/1996 | Chan et al. |
| 5,553,312 A | 9/1996 | Gattey et al. |
| 5,555,490 A | 9/1996 | Carroll |
| 5,555,554 A | 9/1996 | Hofer et al. |
| 5,572,401 A | 11/1996 | Carroll |
| 5,579,400 A | 11/1996 | Ballein |
| 5,581,492 A | 12/1996 | Janik |
| 5,604,050 A | 2/1997 | Brunette et al. |
| 5,607,792 A | 3/1997 | Garcia et al. |
| 5,610,387 A | 3/1997 | Bard et al. |
| 5,637,417 A | 6/1997 | Engmark et al. |
| 5,639,256 A | 6/1997 | Endo et al. |
| 5,665,485 A | 9/1997 | Kuwayama et al. |
| 5,671,037 A | 9/1997 | Ogasawara et al. |
| 5,673,037 A | 9/1997 | Cesar et al. |
| 5,677,834 A | 10/1997 | Mooneyham |
| 5,680,465 A | 10/1997 | Boyden |
| 5,698,834 A | 12/1997 | Worthington et al. |
| 5,716,730 A | 2/1998 | Deguchi |
| 5,719,743 A | 2/1998 | Jenkins et al. |
| 5,719,744 A | 2/1998 | Jenkins et al. |
| 5,729,697 A | 3/1998 | Schkolnick et al. |
| 5,748,841 A | 5/1998 | Morin et al. |
| 5,757,339 A | 5/1998 | Williams et al. |
| 5,762,512 A | 6/1998 | Trant et al. |
| 5,763,867 A | 6/1998 | Main et al. |
| 5,766,794 A | 6/1998 | Brunette et al. |
| 5,774,096 A | 6/1998 | Usuki et al. |
| 5,777,561 A | 7/1998 | Chieu et al. |
| 5,781,644 A | 7/1998 | Chang |
| 5,787,361 A | 7/1998 | Chen |
| 5,793,878 A | 8/1998 | Chang |
| 5,803,750 A | 9/1998 | Purington et al. |
| 5,812,977 A | 9/1998 | Douglas |
| 5,825,045 A | 10/1998 | Koenck et al. |
| 5,828,693 A | 10/1998 | Mays et al. |
| 5,832,098 A | 11/1998 | Chen |
| 5,832,430 A | 11/1998 | Lleida et al. |
| 5,839,104 A | 11/1998 | Miller et al. |

(56) References Cited

U.S. PATENT DOCUMENTS

| | | |
|---|---|---|
| 5,841,630 A | 11/1998 | Seto et al. |
| 5,841,859 A | 11/1998 | Chen |
| 5,844,824 A | 12/1998 | Newman et al. |
| 5,850,181 A | 12/1998 | Heinrich et al. |
| 5,850,187 A | 12/1998 | Carrender et al. |
| 5,856,038 A | 1/1999 | Mason |
| 5,857,148 A | 1/1999 | Weisshappel et al. |
| 5,862,241 A | 1/1999 | Nelson |
| 5,869,204 A | 2/1999 | Kottke et al. |
| 5,873,070 A | 2/1999 | Bunte et al. |
| 5,884,265 A | 3/1999 | Squitteri et al. |
| 5,890,074 A | 3/1999 | Rydbeck et al. |
| 5,890,123 A | 3/1999 | Brown et al. |
| 5,892,813 A | 4/1999 | Morin et al. |
| 5,895,729 A | 4/1999 | Phelps, III et al. |
| 5,903,870 A | 5/1999 | Kaufman |
| 5,905,632 A | 5/1999 | Seto et al. |
| 5,909,667 A | 6/1999 | Leontiades et al. |
| 5,912,632 A | 6/1999 | Dieska et al. |
| 5,920,261 A | 7/1999 | Hughes et al. |
| 5,931,513 A | 8/1999 | Conti |
| 5,933,330 A | 8/1999 | Beutler et al. |
| 5,934,911 A | 8/1999 | Stout et al. |
| 5,935,729 A | 8/1999 | Mareno et al. |
| 5,941,726 A | 8/1999 | Koegel et al. |
| 5,941,729 A | 8/1999 | Sri-Jayantha |
| 5,942,987 A | 8/1999 | Heinrich et al. |
| 5,945,235 A | 8/1999 | Clanton et al. |
| 5,950,167 A | 9/1999 | Yaker |
| 5,956,675 A | 9/1999 | Setlur et al. |
| 5,962,837 A | 10/1999 | Main et al. |
| 5,966,082 A | 10/1999 | Cofino et al. |
| 5,974,384 A | 10/1999 | Yasuda |
| 5,984,709 A | 11/1999 | Zink et al. |
| 5,991,085 A | 11/1999 | Rallison et al. |
| 5,991,726 A | 11/1999 | Immarco et al. |
| 5,993,246 A | 11/1999 | Moldenhauer et al. |
| 5,995,019 A | 11/1999 | Chieu et al. |
| 5,999,085 A | 12/1999 | Szwarc et al. |
| 6,002,918 A | 12/1999 | Heiman et al. |
| 6,012,030 A | 1/2000 | French-St. George et al. |
| 6,016,347 A | 1/2000 | Magnasco et al. |
| 6,021,207 A | 2/2000 | Puthuff et al. |
| 6,022,237 A | 2/2000 | Esh |
| 6,032,127 A | 2/2000 | Schkolnick et al. |
| 6,036,093 A | 3/2000 | Schultz |
| 6,044,347 A | 3/2000 | Abella et al. |
| 6,051,334 A | 4/2000 | Tsurumaru et al. |
| 6,056,199 A | 5/2000 | Wiklof et al. |
| 6,060,193 A | 5/2000 | Remes et al. |
| 6,062,891 A | 5/2000 | Villiers |
| 6,071,640 A | 6/2000 | Robertson, Jr. et al. |
| 6,075,857 A | 6/2000 | Doss, Jr. et al. |
| 6,078,251 A | 6/2000 | Landt et al. |
| 6,078,825 A | 6/2000 | Hahn et al. |
| 6,084,556 A | 7/2000 | Zwern |
| 6,085,428 A | 7/2000 | Casby et al. |
| 6,091,546 A | 7/2000 | Spitzer |
| 6,097,301 A | 8/2000 | Tuttle |
| 6,101,260 A | 8/2000 | Jensen et al. |
| 6,104,281 A | 8/2000 | Heinrich et al. |
| 6,109,526 A | 8/2000 | Ohanian et al. |
| 6,114,625 A | 9/2000 | Hughes et al. |
| 6,120,932 A | 9/2000 | Slipy et al. |
| 6,122,329 A | 9/2000 | Zai et al. |
| 6,127,990 A | 10/2000 | Zwern |
| 6,127,999 A | 10/2000 | Mizutani |
| 6,136,467 A | 10/2000 | Phelps, III et al. |
| 6,137,686 A | 10/2000 | Saye |
| 6,137,868 A | 10/2000 | Leach |
| 6,137,879 A | 10/2000 | Papadopoulos |
| 6,149,451 A | 11/2000 | Weber |
| 6,154,669 A | 11/2000 | Hunter et al. |
| 6,157,533 A | 12/2000 | Sallam et al. |
| 6,160,702 A | 12/2000 | Lee et al. |
| 6,164,853 A | 12/2000 | Foote |
| 6,167,413 A | 12/2000 | Daley, III |
| 6,171,138 B1 | 1/2001 | Lefebvre et al. |
| 6,172,596 B1 | 1/2001 | Cesar et al. |
| 6,173,266 B1 | 1/2001 | Marx et al. |
| 6,179,192 B1 | 1/2001 | Weinger et al. |
| 6,185,535 B1 | 2/2001 | Hedin et al. |
| 6,188,985 B1 | 2/2001 | Thrift et al. |
| 6,190,795 B1 | 2/2001 | Daley |
| 6,195,053 B1 | 2/2001 | Kodukula et al. |
| 6,199,044 B1 | 3/2001 | Ackley et al. |
| 6,204,765 B1 | 3/2001 | Brady et al. |
| 6,225,777 B1 | 5/2001 | Garcia et al. |
| 6,226,622 B1 | 5/2001 | Dabbiere |
| 6,229,694 B1 | 5/2001 | Kono |
| 6,230,029 B1 | 5/2001 | Hahn et al. |
| 6,233,559 B1 | 5/2001 | Balakrishnan |
| 6,233,560 B1 | 5/2001 | Tannenbaum |
| 6,235,420 B1 | 5/2001 | Ng |
| 6,237,051 B1 | 5/2001 | Collins |
| 6,243,682 B1 | 6/2001 | Eghtesadi et al. |
| 6,246,989 B1 | 6/2001 | Polcyn |
| 6,261,715 B1 | 7/2001 | Nakamura et al. |
| 6,266,641 B1 | 7/2001 | Takaya |
| 6,286,763 B1 | 9/2001 | Reynolds et al. |
| 6,302,454 B1 | 10/2001 | Tsurumaru et al. |
| 6,304,430 B1 | 10/2001 | Laine et al. |
| 6,304,436 B1 | 10/2001 | Branch et al. |
| 6,304,459 B1 | 10/2001 | Toyosato et al. |
| 6,310,888 B1 | 10/2001 | Hamlin |
| 6,318,636 B1 | 11/2001 | Reynolds et al. |
| 6,321,198 B1 | 11/2001 | Hank et al. |
| 6,324,053 B1 | 11/2001 | Kamijo |
| 6,325,507 B1 | 12/2001 | Jannard et al. |
| 6,326,543 B1 | 12/2001 | Lamp et al. |
| 6,327,152 B1 | 12/2001 | Saye |
| 6,339,764 B1 | 1/2002 | Livesay et al. |
| 6,349,001 B1 | 2/2002 | Spitzer |
| 6,353,313 B1 | 3/2002 | Estep et al. |
| 6,356,635 B1 | 3/2002 | Lyman et al. |
| 6,357,534 B1 | 3/2002 | Buetow et al. |
| 6,357,662 B1 | 3/2002 | Helton et al. |
| 6,359,603 B1 | 3/2002 | Zwern |
| 6,359,777 B1 | 3/2002 | Newman et al. |
| 6,359,995 B1 | 3/2002 | Ou |
| 6,364,675 B1 | 4/2002 | Brauer et al. |
| 6,369,952 B1 | 4/2002 | Rallison et al. |
| 6,371,535 B2 | 4/2002 | Wei et al. |
| 6,373,693 B1 | 4/2002 | Seto et al. |
| 6,373,942 B1 | 4/2002 | Braund |
| 6,374,126 B1 | 4/2002 | MacDonald, Jr. et al. |
| 6,376,942 B1 | 4/2002 | Burger et al. |
| 6,384,591 B1 | 5/2002 | Estep et al. |
| 6,384,712 B1 | 5/2002 | Goldman et al. |
| 6,384,982 B1 | 5/2002 | Spitzer |
| 6,386,107 B1 | 5/2002 | Rancourt |
| 6,394,278 B1 | 5/2002 | Reed |
| 6,404,325 B1 | 6/2002 | Heinrich et al. |
| 6,422,476 B1 | 7/2002 | Ackley |
| 6,424,357 B1 | 7/2002 | Frulla et al. |
| 6,429,775 B1 | 8/2002 | Martinez et al. |
| 6,434,251 B1 | 8/2002 | Jensen et al. |
| 6,434,526 B1 | 8/2002 | Cilurzo et al. |
| 6,438,523 B1 | 8/2002 | Oberteuffer et al. |
| 6,445,175 B1 | 9/2002 | Estep et al. |
| 6,454,608 B1 | 9/2002 | Kitahara et al. |
| 6,486,769 B1 | 11/2002 | McLean |
| 6,496,799 B1 | 12/2002 | Pickering |
| 6,500,581 B2 | 12/2002 | White et al. |
| 6,501,807 B1 | 12/2002 | Chieu et al. |
| 6,504,914 B1 | 1/2003 | Brademann et al. |
| 6,509,546 B1 | 1/2003 | Egitto et al. |
| 6,511,770 B2 | 1/2003 | Chang |
| 6,523,752 B2 | 2/2003 | Nishitani et al. |
| 6,525,648 B1 | 2/2003 | Kubler et al. |
| 6,529,880 B1 | 3/2003 | McKeen et al. |
| 6,532,148 B2 | 3/2003 | Jenks et al. |
| 6,560,092 B2 | 5/2003 | Itou et al. |
| 6,574,672 B1 | 6/2003 | Mitchell et al. |

(56) References Cited

U.S. PATENT DOCUMENTS

| | | |
|---|---|---|
| 6,581,782 B2 | 6/2003 | Reed |
| 6,595,420 B1 | 7/2003 | Wilz, Sr. et al. |
| 6,597,465 B1 | 7/2003 | Jarchow et al. |
| 6,607,134 B1 | 8/2003 | Bard et al. |
| 6,608,551 B1 | 8/2003 | Anderson et al. |
| 6,628,509 B2 | 9/2003 | Kono |
| 6,639,509 B1 | 10/2003 | Martinez |
| 6,658,130 B2 | 12/2003 | Huang |
| 6,660,427 B1 | 12/2003 | Hukill et al. |
| 6,663,410 B2 | 12/2003 | Revis |
| 6,677,852 B1 | 1/2004 | Landt |
| 6,697,465 B1 | 2/2004 | Goss |
| 6,710,701 B2 | 3/2004 | Leatherman |
| 6,731,771 B2 | 5/2004 | Cottrell |
| 6,743,535 B2 | 6/2004 | Yoneyama |
| 6,745,014 B1 | 6/2004 | Seibert et al. |
| 6,749,960 B2 | 6/2004 | Takeshita et al. |
| 6,754,361 B1 | 6/2004 | Hall et al. |
| 6,754,632 B1 | 6/2004 | Kalinowski et al. |
| 6,769,762 B2 | 8/2004 | Saito et al. |
| 6,769,767 B2 | 8/2004 | Swab et al. |
| 6,772,454 B1 | 8/2004 | Barry et al. |
| 6,778,676 B2 | 8/2004 | Groth et al. |
| 6,811,088 B2 | 11/2004 | Lanzaro et al. |
| 6,812,852 B1 | 11/2004 | Cesar |
| 6,816,063 B2 | 11/2004 | Kubler et al. |
| 6,826,532 B1 | 11/2004 | Casby et al. |
| 6,830,181 B1 | 12/2004 | Bennett |
| 6,847,336 B1 | 1/2005 | Lemelson et al. |
| 6,853,294 B1 | 2/2005 | Ramamurthy et al. |
| 6,859,134 B1 | 2/2005 | Heiman et al. |
| 6,872,080 B2 | 3/2005 | Pastrick et al. |
| 6,890,273 B1 | 5/2005 | Perez |
| 6,909,546 B2 | 6/2005 | Hirai |
| 6,915,258 B2 | 7/2005 | Kontonassios |
| 6,934,675 B2 | 8/2005 | Glinksi et al. |
| 6,965,681 B2 | 11/2005 | Almqvist |
| 6,971,716 B2 | 12/2005 | DePaulis et al. |
| 6,982,640 B2 | 1/2006 | Lindsay et al. |
| 7,003,464 B2 | 2/2006 | Ferrans et al. |
| 7,028,265 B2 | 4/2006 | Kuromusha et al. |
| 7,052,799 B2 | 5/2006 | Zatezalo et al. |
| 7,063,263 B2 | 6/2006 | Swartz et al. |
| 7,082,393 B2 | 7/2006 | Lahr |
| 7,085,543 B2 | 8/2006 | Nassimi |
| 7,099,464 B2 | 8/2006 | Lucey et al. |
| 7,110,800 B2 | 9/2006 | Nagayasu et al. |
| 7,110,801 B2 | 9/2006 | Nassimi |
| 7,143,041 B2 | 11/2006 | Sacks et al. |
| 7,145,513 B1 | 12/2006 | Cohen |
| 7,146,323 B2 | 12/2006 | Guenther et al. |
| 7,216,351 B1 | 5/2007 | Maes |
| 7,228,429 B2 | 6/2007 | Monroe |
| 7,257,537 B2 | 8/2007 | Ross et al. |
| 7,319,740 B2 | 1/2008 | Engelke et al. |
| 7,346,175 B2 | 3/2008 | Hui et al. |
| 7,369,991 B2 | 5/2008 | Manabe et al. |
| 7,398,209 B2 | 7/2008 | Kennewick et al. |
| 7,413,124 B2 | 8/2008 | Frank et al. |
| 7,487,440 B2 | 2/2009 | Gergic et al. |
| 7,496,387 B2 | 2/2009 | Byford et al. |
| 7,519,196 B2 | 4/2009 | Bech |
| 7,604,765 B2 | 10/2009 | Sugimoto et al. |
| 7,619,524 B2 | 11/2009 | Calvarese |
| 8,161,910 B2 | 4/2012 | Coiro, Sr. et al. |
| 2001/0017926 A1 | 8/2001 | Vicamini |
| 2001/0034565 A1 | 10/2001 | Leatherman |
| 2001/0046305 A1 | 11/2001 | Muranami et al. |
| 2002/0003889 A1 | 1/2002 | Fischer |
| 2002/0015008 A1 | 2/2002 | Kishida et al. |
| 2002/0021551 A1 | 2/2002 | Kashiwagi |
| 2002/0044058 A1 | 4/2002 | Heinrich et al. |
| 2002/0076060 A1 | 6/2002 | Hall et al. |
| 2002/0131616 A1 | 9/2002 | Bronnikov et al. |
| 2002/0178344 A1 | 11/2002 | Bourguet et al. |
| 2003/0095525 A1 | 5/2003 | Lavin et al. |
| 2003/0130852 A1 | 7/2003 | Tanaka et al. |
| 2003/0233165 A1 | 12/2003 | Hein et al. |
| 2004/0024586 A1 | 2/2004 | Andersen |
| 2004/0063475 A1 | 4/2004 | Weng |
| 2004/0091129 A1 | 5/2004 | Jensen et al. |
| 2004/0220686 A1 | 11/2004 | Cass |
| 2005/0010418 A1 | 1/2005 | McNair et al. |
| 2005/0095899 A1 | 5/2005 | Mellott et al. |
| 2005/0230388 A1 | 10/2005 | Wu |
| 2005/0272401 A1 | 12/2005 | Zatezalo et al. |
| 2006/0044112 A1 | 3/2006 | Bridgelall |
| 2007/0080930 A1 | 4/2007 | Logan et al. |
| 2007/0221138 A1 | 9/2007 | Mainini et al. |
| 2007/0257795 A1 | 11/2007 | Overhultz |
| 2008/0030320 A1 | 2/2008 | Wilcox et al. |
| 2008/0072847 A1 | 3/2008 | Liao |
| 2010/0127875 A1 | 5/2010 | Wong |
| 2010/0171592 A1 | 7/2010 | Kamemaru |
| 2011/0090062 A1 | 4/2011 | Hofer et al. |

FOREIGN PATENT DOCUMENTS

| | | |
|---|---|---|
| EP | 1 383 029 A2 | 1/2004 |
| EP | 1 531 418 A1 | 5/2005 |
| GB | 2 242 099 A | 9/1991 |
| WO | WO 00/41543 | 7/2000 |
| WO | WO 02/069320 A3 | 9/2002 |
| WO | WO 2005/008476 | 1/2005 |
| WO | WO 2007/044755 A1 | 4/2007 |

# METHOD AND SYSTEM FOR CORRECTLY IDENTIFYING SPECIFIC RFID TAGS

CROSS REFERENCE TO RELATED APPLICATIONS

This application is a continuing application that claims the benefit of priority to co-pending U.S. patent application Ser. No. 12/841,798, filed on Jul. 22, 2010, the entire contents of which is hereby incorporated by reference.

TECHNICAL FIELD

This invention relates generally to systems for reading radio frequency identification (RFID) tags, and more specifically, to a system that can identify a specific RFID tag on a product in the vicinity of other RFID tags.

BACKGROUND

Storage and management of inventory is a critical function of many businesses, including the manufacturing, retail, and shipping industries. For efficiency purposes, it is desirable to communicate product information to a centralized inventory tracking system as the product is being removed or placed on shelves, rather than requiring a separate entry of product information at a central location after removal or placement of the product.

One conventional method for communicating product information to an inventory tracking system includes UPC bar codes that are placed on the products and portable bar code scanners that are carried by the workers manipulating the product. Portable bar code scanners are typically plugged in as an attachment to a portable electronic device such as a mobile computer device. The scanners are used to scan the codes of UPC labels or information on a variety of different items for the purpose of managing, storing, shipping, or otherwise handling such items. Such scanners use optical light signals that are passed over the UPC does to read the codes. Generally, the scanners are pointed at the UPC codes.

While UPC codes and scanners to read such codes provide a convenient system for capturing inventory information, such a system has several drawbacks. First, UPC scanners require a line-of sight to the UPC label or graphic on a package in order to read the code. This may be difficult to achieve when lining up the scanner with the UPC code. Additionally, UPC codes on products or packaging can be damaged or marked up so that reading the code becomes nearly impossible. Consequently, the use of radio frequency identification (RFID) tags has increased, and RFID tags are increasingly growing in popularity to replace the conventional UPC barcode tracking system.

When used on products as an inventory label, RFID tags can communicate data to an RFID reader somewhat similar to a UPC code. An RFID tag includes a microchip with data, an antenna, and sometimes a power source such as a battery (e.g. active RFID tag). An RFID reader also has an antenna, and the RFID reader's antenna transmits electromagnetic energy in the form of an RF beam or radio waves to the vicinity of the RFID tags. Each RFID tag that is located within the range of the RFID reader then energizes and sends identification information back to the RFID reader via RF radio signals. RFID tags, because they radiate their information as radio signals, may be read without having a line-of-sight arrangement between an RFID reader and a tag. While readers often focus their RF beam for efficiency, the RFID read does not have to be specifically pointed at a particular tag like a UPC reader does. In the inventory example, the identification information from an RFID tag may include an Electronic Product Code (EPC), which is a direct replacement for the UPC bar code. Thus, an RFID reader can scan and detect all products carrying an RFID tag within the range of the reader, and no manual scanning of each product is necessary.

Such non-directivity to the RFID scan, however, presents another issue. One drawback of current RFID reader systems is that several RFID tags will be read when they are within the range of the RFID reader. The RFID read process is not selective when a worker removes a specific product from a shelf full of products carrying RFID tags, a reading on an RFID reader will include the EPC or identification information of all the tagged products in the vicinity of the reader's RF beam, not just the selected product removed from the shelf. If the specific RFID tag on the removed product cannot be determined, then the RFID reader will not be able to communicate meaningful information to a centralized inventory system. Alternatively, when a worker is moving around and scanning inventory in a particular area, multiple reads may occur on multiple tags, even though information from only a specific tag is desired. Consequently, it is desirable to have a better control of the reading process and selectively in correctly identifying an RFID tag on a specific product or item.

SUMMARY

The invention according to one embodiment includes a system for identifying a specific RFID tag attached to an item. The system includes RFID reader circuitry configured for sending and receiving RF signals to detect RFID tags and for obtaining signal parameter information associated with the RFID tags. Signal parameter information is obtained regarding the RF signals received by the antenna from one or more of the plurality of tags. The signal parameter information is used to calculate a tag score for the RFID tags and to determine a specific RFID tag using the tag scores for the tags.

In one embodiment, the reader circuitry or RFID reader is operable for determining a received signal strength indication (RSSI) value and an occurrence frequency value for each of the RFID tags. Using received signal strength indication and occurrence frequency values, tag scores are calculated for the RFID tags with processing circuitry running an algorithm. The processing circuitry can be in a separate device or with the reader circuitry. A difference between the highest tag score of the RFID tags and the next highest tag score is compared a first threshold value to determine a specific RFID tag using the tag scores. The RFID tag associated with the highest tag score is selected as the specific RFID tag if the difference exceeds the first threshold value.

The RSSI and occurrence frequency values are added and averaged for the measured RFID tags to calculate a tag score for each RFID tag. Also, before being added and averaged, the RSSI values and occurrence frequency values might be normalized in the process, such as by dividing the RSSI value by the maximum detected RSSI value, and by dividing each occurrence frequency value by the maximum occurrence frequency value detected. One or more of the RSSI value and occurrence frequency values might also be emphasized by multiplying the RSSI and occurrence frequency values by a respective multiplier value.

In one embodiment, if the difference does not exceed the first threshold value, signal parameter information is again extracted and another tag score is calculated for one or more of the RFID tags. The difference is determined between the highest another tag score and the next highest another tag score and the difference is compared to the first threshold value to determine a specific RFID tag using the tag scores. If the difference between the tag scores again does not exceed the first threshold value, the various tag scores for each RFID tag are averaged to determine an average score for each RFID tag, and the difference between the highest average score and the second highest average score is determined and compared to a second threshold value. An RFID tag associated with the highest average score is selected as the specific RFID tag based upon if the difference between the highest average score and the second highest average score exceeds the second threshold value.

BRIEF DESCRIPTION OF THE DRAWINGS

The accompanying drawings, which are incorporated in and constitute a part of this specification, illustrate an embodiment of the invention and, together with a general description of the invention given below, serve to explain the principles of the invention.

DETAILED DESCRIPTION

Figure 1:
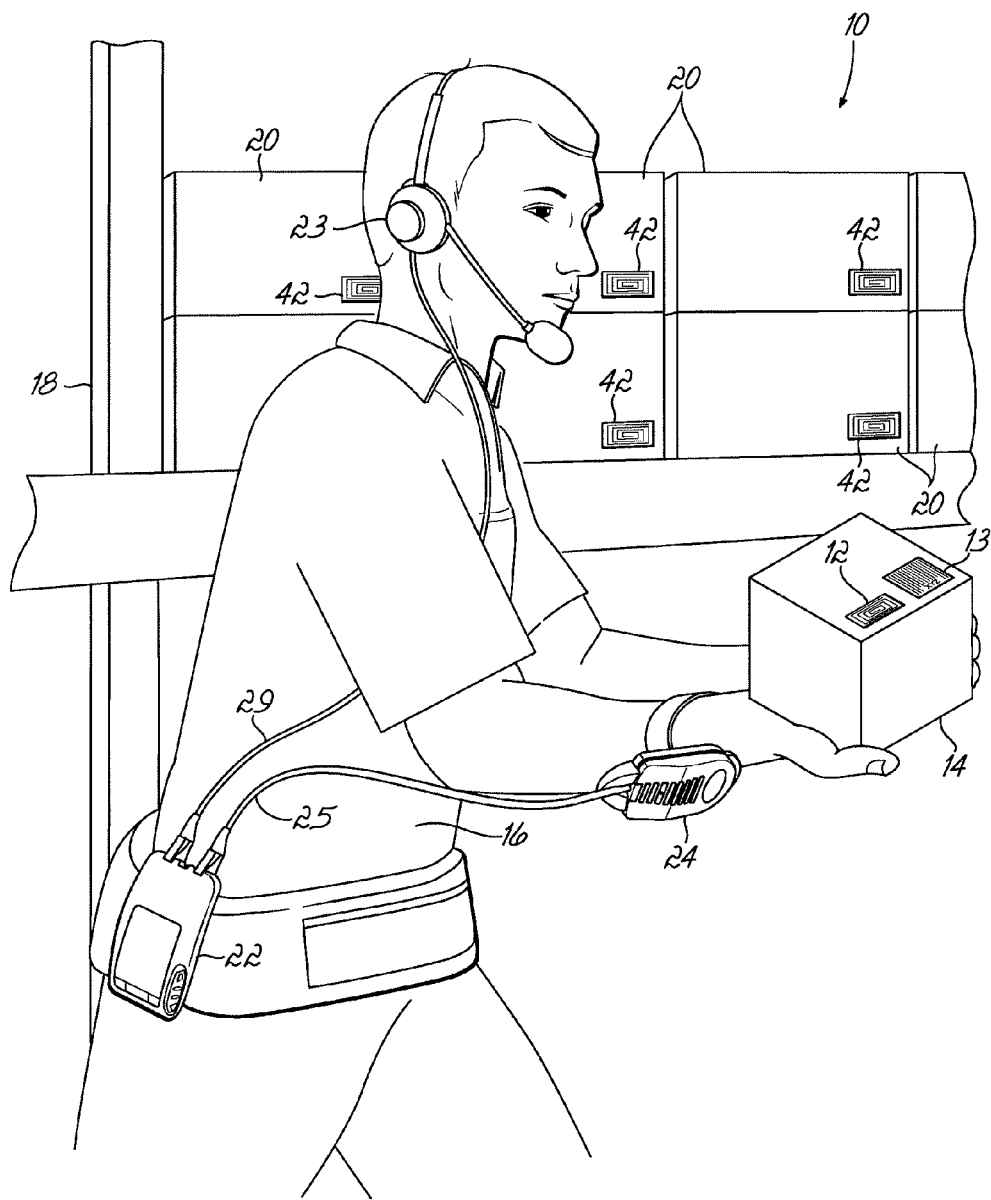
FIG. 1 is an illustration of a worker using an RFID reader for determining an RFID tag of a specified package according to one embodiment of the present invention.
Figure 2:
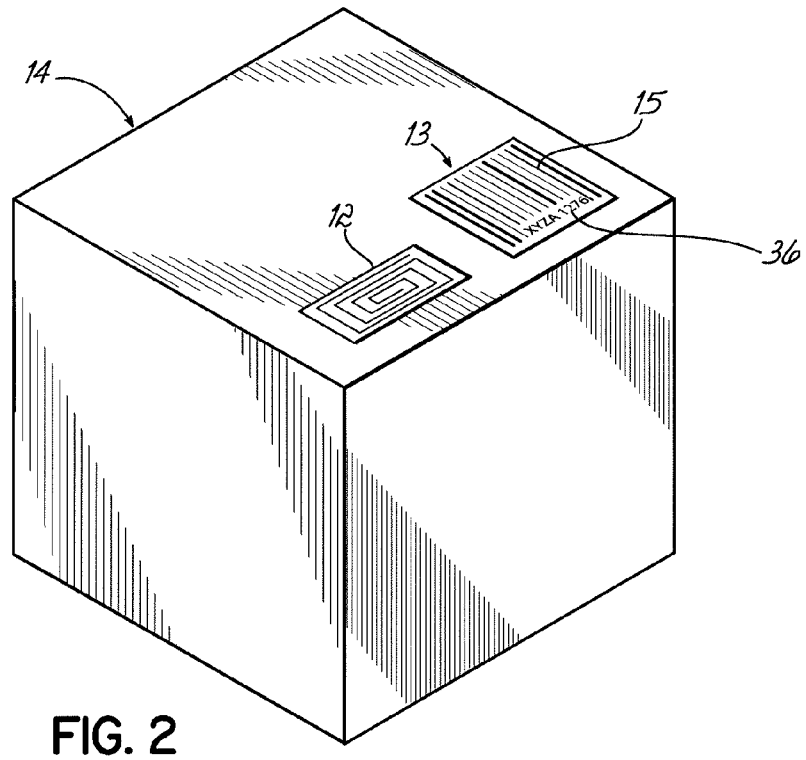
FIG. 2 is a perspective view of a package as in FIG. 1, depicting an exemplary RFID tag and an identification label.
Figure 3:
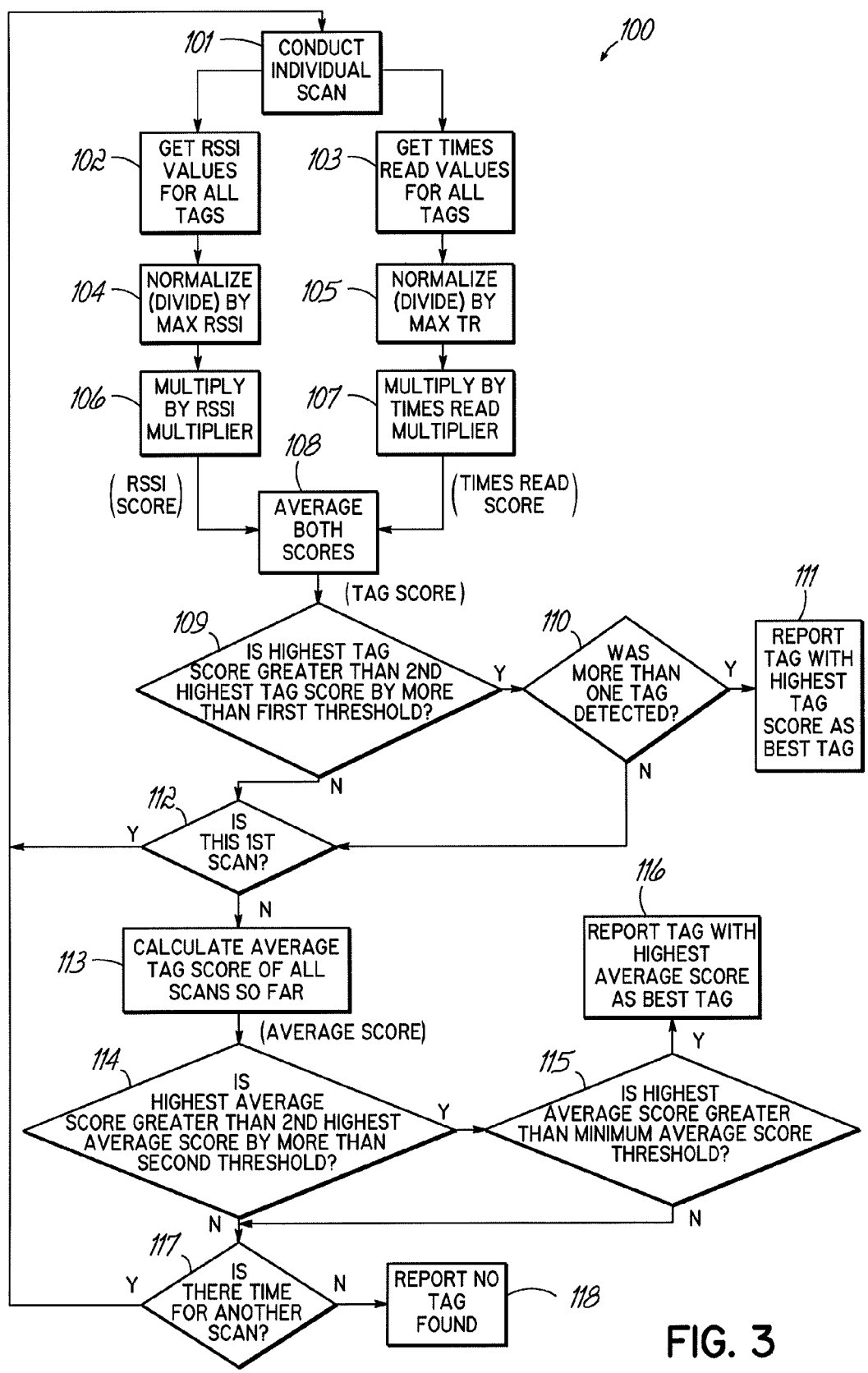
FIG. 3 is a flowchart illustrating the operation of one embodiment of the invention.

Referring to FIGS. 1-3, one embodiment of an RFID reader system 10 for identifying a specific radio frequency identification (RFID) tag 12 attached to an item 14 is illustrated. As shown in FIG. 1, a worker 16 or other user managing the inventory of a business (e.g., filling orders, restocking shelves, etc.), moves around an area where inventory and associated RFID tags are located. While one exemplary embodiment, as disclosed herein, might be useful for managing inventory, it will be generally understood that the invention has applicability in any environment where RFID tags are used. Therefore, the invention is not at all limited to just inventory uses.

In the illustrated example, worker 16 may pick up a specific item 14, such as a box, from a rack or shelf 18 holding a plurality of other boxes 20 or other items. As the worker 16 moves the specific box 14 to a cart or some other location, the worker 16 may record the identification information of the specific box 14 for use by a central inventory management system so as to record the disposition of the items 14, 20, or otherwise track movement of the items so that the inventory records remain accurate.

As illustrated in FIG. 1, worker 16 may carry a portable electronic device 22, such as a portable or mobile computer device, that is configured to process information and to communicate with a remote or central management system 23 (See FIG. 1A) and/or other workers. To that end, device 22 might incorporate a Wi-Fi link to the remote or central system 23. Once suitable such device 22 for use with the invention would be a Talkman® device available from Vocollect, Inc. of Pittsburgh, Pa. The work environment, for example, might be a speech-directed or speech-assisted work environment wherein the worker 16 would interface with a central system utilizing speech through speech recognition and text-to-speech (TTS) functionalities. Device 22 might be coupled to a headset 28, such as by a cord 29 or a suitable wireless link for the speech interaction. Also coupled to device 22 is a portable RFID reader 24 that is also coupled to device 22 through a cord 25 or a wireless link. RFID reader 24 may be carried or worn by the user as shown in FIG. 1 and incorporates internal electronics and an internal or external antenna, along with suitable controls for providing the desired RFID reader functionality, according to aspects of the invention. FIG. 1 illustrates just one possible embodiment of an RFID reader 24 that can implement the invention.

Figure 1A:
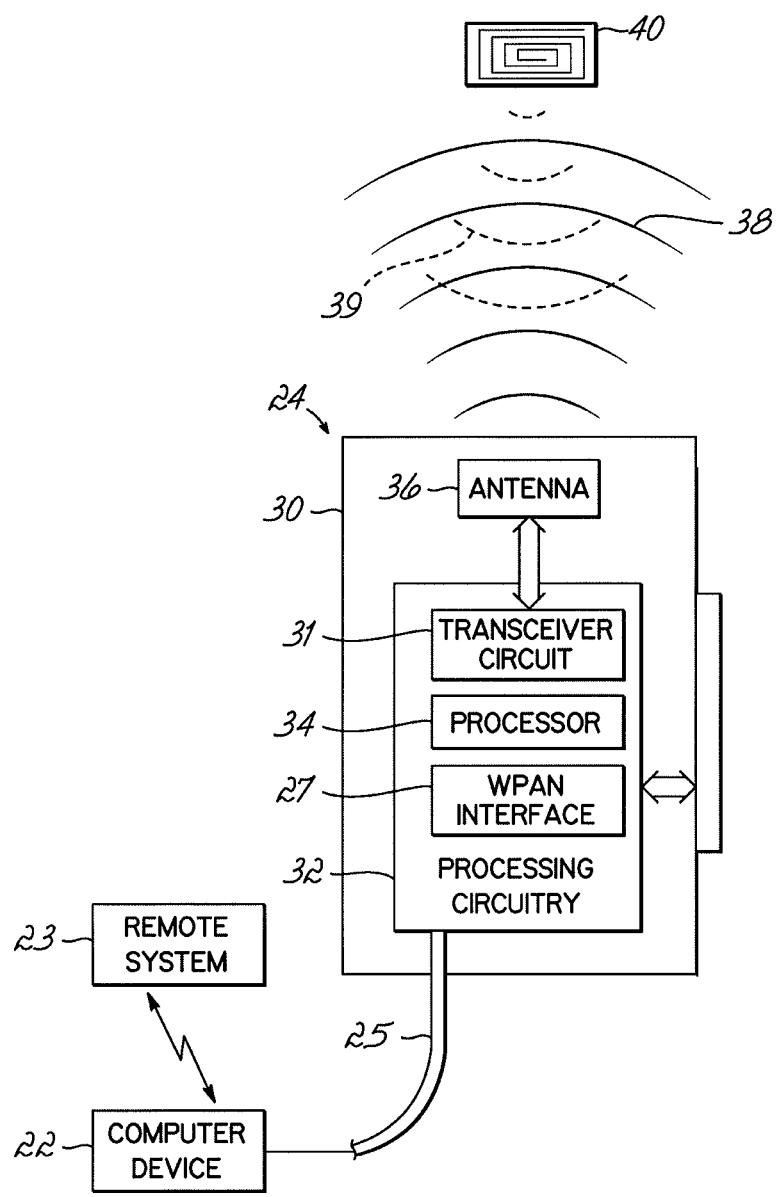
FIG. 1A is a schematic diagram of an RFID reader device in accordance with one embodiment of the invention.
Figure 1B:
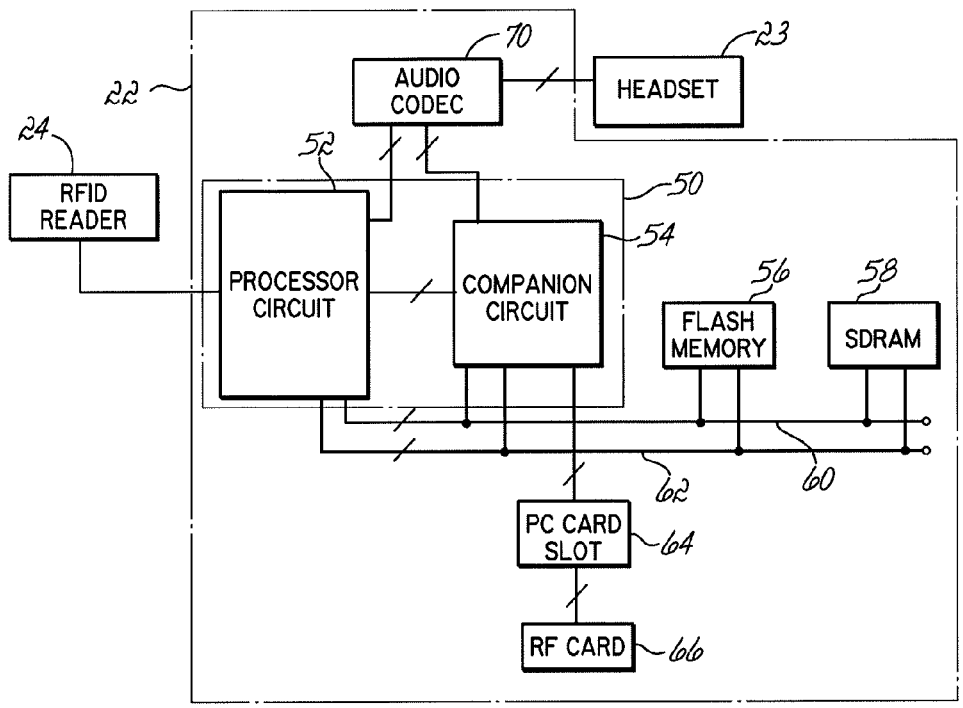
FIG. 1B is a schematic diagram of a computer device for use in one embodiment of the invention.

FIGS. 1A and 1B illustrate components, including an RFID reader and a computer device for implementing embodiments of the invention. Referring to FIG. 1A, an RFID reader 24 includes a housing 30 that contains suitable processing circuitry 32 controlled by a microprocessor or other processor element 34 for implementing the RFID read functionality of the reader 24. In some embodiments of the invention, the processor and processing circuitry might also provide an RFID write functionality. However, the present invention is directed primarily to the read functionality of reader 24. The reader 24 also includes an antenna 36 that is utilized to transmit and receive RF signals 38, with respect to an RFID tag 40. While antenna 36 is shown internal to the housing 30 of RFID reader 24, the antenna might also be an external antenna. The antenna 36 will generally be coupled to a suitable transceiver circuit 31 that may be implemented as part of the processing circuitry 30 of reader 24. The reader 24, and particularly the processing circuitry 32, may be coupled to computer device 22, such as by cord 25. Alternatively, processing circuitry 32 might also provide a wireless link, such as a WPAN link through a WPAN interface 27, for example, to communicate with computer device 22. Device 22 might then further process and utilize the RFID information obtained utilizing reader 24. In accordance with one aspect of the present invention, the invention provides a selectivity to the RFID read operation so that a desired RFID tag and the information associated therewith may be isolated from other RFID tags which are in the vicinity of the desired tag and are also read during the RFID reading process. In accordance with one aspect of the invention, signal parameter information is extracted or obtained regarding one or more RFID tags. The signal parameters information is then used and further processed to determine a specific RFID tag.

In one embodiment, the signal parameter information is captured by the RFID reader and passed to computer device 22 for further processing. In other embodiments, the processing to determine a specific RFID tag might be handled by the processing circuitry of RFID reader 24, or elsewhere, such as in computers or servers of remote system 23. Accordingly the invention is not limited to the embodiments discussed and disclosed herein. Also, the processing and implementation of the algorithm disclosed herein might be handled in part by processing circuitry of various of the reader 24, device 22 and remote system 23 and the algorithm does not have to be implemented completely in one component.

FIG. 1B is a block diagram of one exemplary embodiment of a computer device for use in implementing the invention. Specifically, device 22 includes processing circuitry 50 which may include a processor element 52 for controlling the operation of the computer device and other associated processing circuitry. Such processors generally operate according to an operating system, which is a software speech implemented series of instructions. Processing circuitry 30 may also implement one or more application programs in accordance with the invention. Processor 52 may be a main processor chip coupled to a suitable companion processor circuit. Processing circuitry 50 may also be coupled to appropriate memory, such as flash memory 56 and random access memory 48. The processor and companion components 52, 54 may be coupled to the memory 56, 58, through appropriate buses such as an address bus 60 and data bus 62. When the present invention is utilized within a speech-based or voice-based system, the headset 23 may interface with device 22 through an appropriate audio coder/decoder chip or CODEC 70. To provide communications with remote system 23, such as over a wireless link, device 22 might also incorporate a suitable RF communication card 66 coupled through an appropriate slot 64 with the processing circuitry 50. As discussed herein, various of the processing provided by the invention for the selection of a specific RFID tag from among a plurality of tags might be handled through the processing circuitry 50 of device 22, through processing circuitry associated with the remote system 23, or directly through the processing circuitry of the RFID reader 24, or a combination of various of those elements. In one embodiment of the invention, the RFID reader is configured for sending and receiving RF signals for detecting RFID tags and obtaining signal parameter information associated with the RFID tags. Computer device 22 then runs the specific processing algorithm for using the signal parameter information regarding the RF signals received by the reader device from one or more of the RFID tags, and for using the signal parameter information to determine a specific RFID tag as discussed further herein below.

Referring again to FIGS. 1 and 2, an item or box 14 carries an RFID tag 12 that contains an electronic product code (EPC) 36 that may be read by reader 24. The EPC or other identification information might also be written on a UPC bar code label 13, along with the UPC code information 15. While the example illustrated herein for explaining the invention refers to a particular item or box 14 carrying an RFID tag, it would be readily understood by a person of ordinary skill in the art that the RFID tags might also be utilized to provide information regarding a larger number of individual items, such as a case of items, a pallet of items, or some other manageable inventory unit that has multiple items, boxes, or packages therein. Furthermore, RFID tags might be utilized to provide information regarding a particular location of an item, such as a warehouse aisle, shelf, slot, or bin within a larger warehouse environment. Accordingly, the present invention is not limited to the particular type of information stored or use of an RFID tag.

The RFID reader 24 includes an antenna 36 that sends out, or transmits, electromagnetic energy in the form of RF radio waves or signals 38 to a surrounding area during the read process. The RFID tag 12 receives this electromagnetic energy and the circuitry of the tag is then energized to send a reply RF or radio wave signal carrying or containing the EPC information or other information stored on the tag back to the RFID reader 24. The reply or return tag RF signal 39 is received by the antenna 36 and directed to the processing circuitry 32 for further processing of the tag information. However, referring to FIG. 1, every other box 20 on a storage rack 18 adjacent to the worker 16 also carries an RFID tag 42 that receives the same electromagnetic energy 38 and may send back a signal 39 with identification information to the RFID reader 38. However, the other tags 42 may have information not associate with the item 14 that is handled by the worker 16. Thus, the signal of the specific RFID tag 12 on the desired box or item 14 and the information associated therewith must be reliably distinguished from the multiple signals of the other RFID tags 42 on the non-selected items boxes 20 so that the correct EPC 36 and product information can be recorded and processed by the reader 24, portable electronic device 22, and ultimately by the central inventory management system or other system.

To implement the invention to determine the correct RFID tag 12, the RFID reader 24 includes circuitry, such as processing circuitry 32 that is configured to extract or obtain signal parameter information as discussed below, and to operate, in one embodiment, in conjunction with device 22 to determine a specific RFID tag. For example, processing circuitry 32 might incorporate or be implemented by an RFID module from ThingMagic of Cambridge, Mass. To extract, calculate or otherwise obtain signal parameter information like RSSI values and "Times Read" values.

Specifically, the processing circuitry 32 is configured to extract information about RFID tags to be used by an algorithm for determining the proper or "best" tag that is read. A worker or user will pick up a box 14 with a tag 12, and they will initiate a scan with RFID reader 24. The algorithm is implemented in the invention within a certain time period in order to determine the information from a box or other tagged item in the worker's hand. If that information is determined promptly and properly, that information can be utilized, such as to direct the worker on how to further process the item. For example, in one embodiment of the invention, the inventive reader 24 might be implemented with a TALKMAN® portable computer device 22, which utilizes speech in a speech-directed or speech-assisted work environment. Information from the tag might be utilized by the TALKMAN® device 22, which then utilizes speech to direct a worker 16 how to further proceed. For example, the information that is read from the RFID tag might be an EPC code, a product description, or some other information. That information can be utilized by the worker to verify that the RFID read task was correctly implemented. If the invention does not determine information from the RFID read process after a certain period of time, it will return feedback information to the worker that no tags were found, such as in the form of an indication of "No Tags Founds". If no tags are found, the worker can either do a re-scan, or they can use some other mode of entering the information, such as an EPC code. For example, in utilizing a TALKMAN® device 22, the worker might use voice to enter the EPC code or other information. Any re-scan process is repeated as desired, and the algorithm of the invention will have a specific period of time to correctly identify an item or otherwise read information from an RFID tag.

In accordance with one embodiment of the invention, the RFID read algorithm of the invention has a certain period of time, for example three seconds, to figure out or determine the proper RFID tag from which information is to be extracted or read. This time period might be broken down into a series of individual scans. For example, three 750 millisecond scans might be utilized. After the first scan, the invention determines if it knows the desired tag or "best" tag. If so, the tag information is returned as coming from the best tag or desired tag, and that RFID information is then further processed. If not, another RFID read or scan is done. After the second RFID scan, the invention again checks to know if it has determined the "best" tag. If so, the desired information read from the RFID tag is returned. If the best or desired tag still is not known, an additional scan might be done. The process might be repeated until the invention determines the best or desired tag. If it still cannot determine the best tag after a particular time period, the algorithm exits, and an indication such as "No Tags Found" might be returned to the worker or other user.

The RFID reader 24 performs a certain number of read cycles in a predetermined length of time, for example, the 750 milliseconds scan to obtain signal parameter information from one or more RFID tags. For each RFID tag 12, 42 in the range or vicinity of the RFID reader 24, the reader evaluates the signal parameters associated with the signals received from each of the tags. The RFID reader 24, and particularly the processing circuitry 32 or RFID module of the reader, detects and returns a "received signal strength indication" (RSSI) parameter. The RSSI parameter value for each tag is a measurement of the power present in a received radio signal from the tag. The reader 24 also returns an "occurrence frequency" or "TIMES READ" parameter that has a value indicative of the number of times the RFID tag 12, 42 has been read in the 750 milliseconds scan. These received signal parameter values and parameter information are used by processing circuitry and a control algorithm described herein to determine the desired RFID tag. The RSSI values and TIMES READ values or occurrence frequency information are further processed to calculate a tag score for each RFID tag 12, 42 detected according to the invention.

In one embodiment of the invention, processing circuitry in the computer device implements a control algorithm 100 to calculate the tag scores and to determine which of the RFID tags 12, 42 detected by the RFID reader 24 is the specific RFID tag 12 (best tag) on the specific box or item 14 carried by the worker 16. The control algorithm 100 is schematically illustrated in the flow chart of FIG. 3 and will be described in further detail below. The RFID reader 24 captures the signal parameter information (e.g., RSSI and "TIMES READ" parameters) and sends the information to device 22 for further processing. In another embodiment, the RFID reader processing circuitry 22 might perform the algorithm 100. In still another embodiment, the information might be forwarded to remote system 23 where the algorithm 100 is performed. In still another embodiment, such further processing of the information collected by reader 24 and the performance of the algorithm might be distributed over the various system components/devices including the RFID reader, computer device 22 and remote system 23. As such, even though the exemplary system described herein uses the device 22 for predominately processing algorithm 100, the invention is not limited to just that scenario.

As discussed further hereinbelow, the present invention incorporates a multiple-step algorithm for determining the desired tag or best tag during the reading process. If the best tag is not determined in the first stage, a second stage or even further additional stages might be utilized in accordance with aspects of the invention to determine the best tag.

Generally speaking, the control algorithm 100 will have a total detection time period, such as 3 seconds for example, to determine the identification information for the box 14 held by the worker 16. The processing circuitry implementing the algorithm is pre-programmed to break up this total detection time period into smaller segments or scans, for example the 750 millisecond scans noted above. The detection time will be whatever might be appropriate for running individual scans and analyzing the results, and the invention is not limited to a particular detection time or scan time. A worker 16 may begin a scan by pressing an appropriate button, or controlled element on the reader 24. The reader 24 might also be controlled via computer 22.

If a first individual scan of the RFID tags 12, 42 in the vicinity of the RFID reader 38 determines the specific RFID tag 12, then the processing stops the algorithm at that time and reports the identification information to the worker 16 and/or the portable electronic device 22 or remote system 23. If the processing circuitry cannot determine the specific RFID tag 12 from the first individual scan, more individual scans are conducted until either the specific RFID tag 12 is determined or the detection time period finishes, or times out. If the specific RFID tag 12 is not determined within the detection time period, then the processing circuitry of computer device 22 reports that no specific tag was detected. The worker 16 can then choose to run another scan over another detection time period, or alternatively, manually or verbally enter the EPC 36 from the specific box 14 into the portable electronic device 22.

Referring to FIG. 3, the control algorithm 100 for the processing circuitry 32 begins with an individual scan at step 101. As described above, the individual scan consists of sending out a signal in the form of a plurality of radio waves 38 from the antenna 40 of an RFID reader 38 and receiving return radio wave signals 39 from all RFID tags 12, 42 in the vicinity of the RFID reader output waves 38. Such scans result in received information from the received RF signals including signal parameter information. The processing circuitry, such as the processing circuitry of computer device 22, analyzes the readings and received signal parameters for the tags from the RFID reader 38 at step 102 to determine the RSSI signal parameter value for each RFID tag 12, 42. The processing circuitry also simultaneously analyzes the readings sent from the RFID reader 38 at step 103 to determine the occurrence frequency or "Times Read" signal parameter value for each RFID tag 12, 42.

Next, the RSSI values are normalized by the processing circuitry at step 104 such as by dividing the RSSI for each RFID tag 12, 42 by the maximum RSSI value of all tags read during that particular scan. Similarly, the Times Read values are normalized by the processing circuitry at step 105 such as by dividing the Times Read for each RFID tag 12, 42 by the maximum Times Read value. Thus, a normalized value between zero and one is calculated for the RSSI and Times Read values of each RFID tag 12, 42 in accordance with one embodiment of the invention.

The processing circuitry and algorithm may need to emphasize one of the detected metrics over the other. For example, it may be determined that the signal strength is more indicative of the specified RFID tag 12 than the occurrence frequency, or vice versa. Consequently, in one embodiment, an RSSI multiplier and a Times Read multiplier are stored and used in the control algorithm 100. To favor the RSSI metric, the RSSI multiplier will be greater than the Times Read multiplier. In step 106, the normalized RSSI values are multiplied by the RSSI multiplier to determine an RSSI score for each RFID tag 12, 42. Similarly in step 107, the normalized Times Read values are multiplied by the Times Read multiplier to determine a Times Read score for each RFID tag 12, 42. To favor the Time Read metric, that multiplier might be greater than the RSSI multiplier. Preferably, the RSSI multiplier and the Times Read multiplier will add up to a total value of 2, such that the tag scores remain normalized (between zero and one) when the RSSI score and the Times Read score are averaged in step 108. However, this limitation on the multipliers and tag scores is not absolutely necessary.

Averaging the RSSI score and the Times Read score is performed by adding those two score values for each RFID tag 12, 42 and then dividing the sum by two. Therefore, the processing circuitry and algorithm 100 determine a tag score for each RFID tag 12, 42 at step 108.

At this stage of the control algorithm 100, the processing circuitry determines which tag scores are the highest tag score and the next highest or second highest tag score if there are multiple tags and multiple tag scores at issue. At step 109, the processing circuitry 32 determines the difference between the highest and next highest tag scores and compares the difference between the highest tag score and the next or second highest tag score to a stored first threshold value stored used by the processing circuitry. If the difference between the tag scores is higher than the first threshold value, the control algorithm 100 continues to step 110. At step 110, the processing circuitry determines if more than one RFID tag 12, 42 was detected. If more than one tag was detected, then the RFID tag with the highest tag score is selected and reported as the specific RFID tag 12. In step 111, reader 24 reports or causes device 22 to report that the specified RFID tag 12 has been determined. In some embodiments, the portable electronic device 22 may report the EPC 36 or other identification information associated with the specified RFID tag 12. For example, an audible indicator might be used to indicate that a specific RFID tag has been determined. An audible indication like voice from the headset 28 might be used so that a worker 16 can verify that the correct RFID tag 12 was determined. If the processing circuitry and algorithm determine that the difference between tag scores does not exceed the first threshold in step 109, or if it determines than only one RFID tag was detected in step 110, then the algorithm continues to step 112.

At step 112, the processing circuitry determines if the individual scan just conducted in step 101 was the first scan. If so, the control algorithm returns back to step 101 to run another individual scan. Once a second set or another set of tag scores is determined, the same process of comparing the difference of the two highest tag scores to the first threshold is repeated at step 109. If this difference still does not exceed the first threshold value, then the processing circuitry will pass step 112 and continue to step 113. In step 113, an average tag score for each RFID tag 12, 42 is determined by taking the simple average of all tag scores for each RFID tag 12, 42 from the previous individual scans. At step 114, the processing circuitry and algorithm compares the highest average score and the second highest average score to determine if the difference between these average scores is greater than a stored second threshold value stored used by the processing circuitry. If the difference between the average scores exceeds the second threshold, the control algorithm 100 continues to step 115. At step 115, the algorithm determines if the highest average score is greater than a predetermined minimum average score threshold. If so, then the RFID tag with the highest tag score is the specified RFID tag 12 at step 116, which reports the identification information, as previously described with respect to step 111. If the processing circuitry determines that the difference between the average scores does not exceed the second threshold value in step 114, or if the processing circuitry determines the highest average score was actually lower than the predetermined minimum average score threshold in step 115, then algorithm continues to step 117.

At step 117, the algorithm determines if there is enough time remaining in the detection time period for an additional individual scan. If so, the processing circuitry returns to step 101 of the control algorithm for an additional individual scan and determination of whether the specified RFID tag 12 has been located using tag scores or average scores. If the processing circuitry determines that there is not enough time remaining for another individual scan at step 117, the processing circuitry reports that no RFID tag was found at step 118. Again, the worker 16 can then determine whether another scan will be performed or whether the EPC 36 or other identification information on the label 13 of the specific box 14 will be entered manually or verbally. Consequently, the specific RFID tag 12 on the specific item 14 carried by the worker 16 can be reliably determined and recorded using the RFID reader 24 and the associated control algorithm 100, regardless of how many other RFID tags 42 are in the vicinity of the worker 16.

A pair of example cases is provided below to further illustrate the operation of the control algorithm 100. In each example, the following parameters are set: the detection time period is 3 seconds; the individual scan time is 750 milliseconds; the Times Read multiplier is 1.2; the RSSI multiplier is 0.8; the first threshold value is 0.45; the second threshold value is 0.2; and the minimum average score threshold value is 0.8. Note that these parameters are configurable to adapt the control algorithm 100 for maximum effectiveness depending on the work conditions and RFID reader environment. For example, testing may be used during development to determine the best values. These values are then set in software.

Example A

In the first case, the first individual scan at step 101 of the control algorithm 100 reports the following information: Tag A was detected with an RSSI value of 100 and a Times Read value of 20, while Tag B was detected with an RSSI value of 80 and a Times Read value of 5. At step 104, the RSSI values are normalized by dividing each RSSI value by the maximum RSSI value, which is 100 in this example. Therefore, the normalized RSSI values are 1.0 and 0.8. At step 105, the Times Read values are also normalized by dividing each Times Read value by the maximum Times Read value, which is 20 in this case. Therefore, the normalized Times Read values are 1.0 and 0.25. These steps provide Tag A with a normalized RSSI of 1.0 and a normalized Times Read of 1.0, and Tag B with a normalized RSSI of 0.8 and a normalized Times Read of 0.25. At steps 106 and 107, the normalized values are further emphasized by multiplying them by the respective RSSI multiplier and Times Read multiplier. This provides Tag A with an RSSI score of 0.8 and a Times Read score of 1.2, while Tag B has an RSSI score of 0.64 and a Times Read score of 0.3. At step 108, these scores (i.e. RSSI and Times Read) are averaged by adding them together and dividing by two. This yields a tag score for Tag A of 1.0 while the tag score for Tag B is 0.47. At step 109, the processing circuitry 32 determines that the difference between these two highest tag scores is 0.53. The 0.53 value exceeds the first threshold of 0.45 (Step 109). Because more than one tag was detected (Step 110), Tag A will be reported as the specific RFID tag at step 111 and the control algorithm 100 ends.

Example B

In the second case, the first individual scan at step 101 of the control algorithm 100 reports the following information: Tag A was detected with an RSSI value of 100 and a Times Read value of 20, while the next highest tag, Tag B, was detected with an RSSI value of 80 and a Times Read value of 10. At step 104, the RSSI values are normalized by dividing each RSSI value by the maximum RSSI value, which is 100 in this case. At step 105, the Times Read values are normalized by dividing each Times Read value by the maximum Times Read value, which is 20 in this case. These steps provide Tag A with a normalized RSSI of 1.0 and a normalized Times Read of 1.0, and Tag B with a normalized RSSI of 0.8 and a normalized Times Read of 0.5. At steps 106 and 107, the normalized values are emphasized by multiplying them by the respective RSSI multiplier and Times Read multiplier. This provides Tag A with an RSSI score of 0.8 and a Times Read score of 1.2, while Tag B has an RSSI score of 0.64 and a Times Read score of 0.6. At step 108, these scores are averaged to determine that the tag score for Tag A is 1.0 while the tag score for Tag B is 0.62. At step 109, the processing circuitry 32 determines that the difference between these two highest tag scores is 0.38, which does not exceed the first threshold of 0.45. Thus, the processing circuitry 32 returns through step 112 back to step 101 to conduct another individual scan.

In the second individual scan, the following information is provided: Tag A was detected with an RSSI value of 100 and a Times Read value of 20, while Tag B was detected with an RSSI value of 90 and a Times Read value of 12. At step 104, the RSSI values are normalized by dividing each RSSI value by the maximum RSSI value, which is 100 in this case. At step 105, the Times Read values are normalized by dividing each Times Read value by the maximum Times Read value, which is 20 in this case. These steps provide Tag A with a normalized RSSI of 1.0 and a normalized Times Read of 1.0, and Tag B with a normalized RSSI of 0.9 and a normalized Times Read of 0.6. At steps 106 and 107, the normalized values are emphasized by multiplying them by the respective RSSI multiplier and Times Read multiplier. This provides Tag A with an RSSI score of 0.8 and a Times Read score of 1.2, while Tag B has an RSSI score of 0.72 and a Times Read score of 0.72. At step 108, these scores are averaged to determine that the tag score for Tag A is 1.0 while the tag score for Tag B is 0.72. At step 109, the processing circuitry 32 determines that the difference between these two highest tag scores is 0.28. This difference again does not exceed the first threshold value of 0.45. Now that two scans have been performed, the processing circuitry 32 moves to step 113 in the control algorithm 100.

At step 113, the average score for each tag is calculated as follows: Tag A had a first tag score of 1.0 and a second tag score of 1.0, the average of which is also 1.0. Tag B has a first tag score of 0.62 and a second tag score of 0.72, the average of which is 0.67. At step 114, the highest average score of Tag A (1.0) is compared to the second highest average score of Tag B (0.67). The difference between these average scores is 0.33, which exceeds the second threshold value of 0.2. As such, the processing circuitry 32 continues to step 115, where the processing circuitry 32 determines that the highest average score (1.0) does exceed the predetermined minimum average score threshold of 0.8. Thus, Tag A will be reported as the specific RFID tag at step 116 and the control algorithm 100 ends. If the average score determinations at step 114 and step 115 had been unsuccessful, another individual scan would have been run in this example because of remaining time.

If subsequent scans yield no tags, the reader 24 reports that no tag is found (Step 118). Therefore, the present invention provides a way of insuring that the desired RFID tag is read, and that the desired information is extracted from that tag for further use and processing of the tag information and the item associated with that tag information. The various alternative scenarios set forth above and other scenarios help a worker or user make a proper RFID scan and read, and creates greater efficiency in the RFID reader process. Furthermore, the invention removes the guesswork associated with trying to obtain the proper RFID read, and also does not require that the RFID reader be specifically focused in the direction of one particular item. The invention filters any stray information from other RFID tags, and insures that the proper information is utilized and processed.

While the present invention has been illustrated by the description of the embodiment thereof, and while the embodiment has been described in considerable detail, it is not the intention of the applicant to restrict or in any way limit the scope of the appended claims to such detail. Additional advantages and modifications will readily appear to those skilled in the art. For example, the average score calculations and determinations may not be performed until after a third individual scan in an alternative embodiment. Therefore, the invention in its broader aspects is not limited to the specific details representative apparatus and method, and illustrative examples shown and described. Accordingly, departures may be made from such details without departure from the spirit or scope of applicant's general inventive concept.

What is claimed is:

1. A system for identifying a specific RFID tag, the system comprising:
   RFID reader circuitry that sends and receives RF signals to detect RFID tags and for obtaining signal parameter information associated with the RFID tags including a plurality of different signal parameter values associated with the RFID tags;
   processing circuitry that uses the signal parameter information for one or more tags of the RFID tags to calculate a tag score for the one or more RFID tags and gives a different weight to at least one of the signal parameter values over another signal parameter value in the calculation of the tag score by multiplying the at least one signal parameter value by a respective multiplier.

2. The system of claim 1 wherein the RFID reader circuitry and the processing circuitry are contained in a single device.

3. The system of claim 1 wherein the RFID reader circuitry and the processing circuitry are contained in separate devices.

4. The system of claim 1 further comprising an RFID reader containing the RFID reader circuitry and a computer device containing the processing circuitry.

5. The system of claim 1, wherein the RFID reader circuitry obtains signal parameter values including a received signal strength indication (RSSI) value and an occurrence frequency value for the one or more RFID tags and the processor circuitry is operable for using RSSI values and occurrence frequency values to calculate tag scores for one or more tags of the RFID tags.

6. The system of claim 5 wherein the processing circuitry averages the RSSI and occurrence frequency values for each of the one or more RFID tags to calculate a tag score for each of the one or more RFID tags.

7. The system of claim 5 wherein the processing circuitry normalizes the RSSI values and occurrence frequency values by dividing the RSSI value by a maximum detected RSSI value, and normalizing the occurrence frequency value by dividing the occurrence frequency value by the maximum detected occurrence frequency value.

8. The system of claim 1 wherein the processing circuitry determines a difference between a highest tag score and a next highest tag score for the one or more RFID tags and compares the difference to a first threshold value to identify the specific RFID tag using the tag scores.

9. The system of claim 8 wherein the processing circuitry selects the RFID tag associated with the highest tag score as the specific RFID tag if the difference exceeds the first threshold value.

10. The system of claim 8 wherein when the difference does not exceed the first threshold value, to again obtain signal parameter information associated with the RFID tags and to calculate another tag score for the one or more RFID tags and to determine a difference between a highest another tag score and a next highest another tag score and to compare the difference between a highest another tag score and a next highest another to score to the first threshold value to identify the specific RFID tag using the another tag scores.

11. The system of claim 10, wherein when the difference between the another tag scores again does not exceed the first threshold value, the processing circuitry:
   averages the tag score and the another tag score for each RFID tag to determine an average score for each RFID tag;
   determines a difference between the highest average score and the second highest average score;
   compares the difference between the highest average score and the second highest average score to a second threshold value; and
   selects the RFID tag associated with the highest average score as the specific RFID tag based upon if the difference between the highest average score and the second highest average score exceeds the second threshold value.

12. The system of claim 11 wherein the processing circuitry is further operable, if the difference between the highest average score and the second highest average score exceeds the second threshold value, to determine if the highest average score is greater than a minimum average score threshold.

13. The system of claim 5 wherein the at least one RSSI value and occurrence frequency value is normalized before emphasizing the value with a respective multiplier value.

14. The system of claim 1, wherein the processing circuitry provides an audible indication when the specific RFID tag has been determined.

15. A method for identifying a specific RFID tag, the method comprising:
   sending and receiving RF signals to detect RFID tags and obtain signal parameter information associated with the RFID tags, the signal parameter information including a plurality of different signal parameter values associated with the RFID tags;
   using the signal parameter information for one or more RFID tags and calculating a tag score for the one or more RFID tags; and
   in calculating the tag score, weighting at least one signal parameter values over another signal parameter value by multiplying the at least one signal parameter value by a respective multiplier value.

16. The method of claim 15 further comprising determining a received signal strength indication (RSSI) value and an occurrence frequency value for each of the for the one or more RFID tags and using RSSI values and occurrence frequency values to calculate tag scores for one or more of the RFID tags.

17. The method of claim 16 further comprising averaging the RSSI and occurrence frequency values for each of the one or more RFID tags to calculate a tag score for each of the one or more RFID tags.

18. The method of claim 17 further comprising determining a difference between a highest tag score for the one or more RFID tags and a next highest tag score and comparing the difference to a first threshold value to identify the specific RFID tag using the tag scores.

19. The method of claim 18 further comprising selecting the RFID tag associated with the highest tag score as the specific RFID tag if the difference exceeds the first threshold value.

20. The method of claim 15 further comprising normalizing the RSSI value and occurrence frequency value by dividing the RSSI value by the maximum detected RSSI value, and by dividing the occurrence frequency value by the maximum detected occurrence frequency value.

* * * * *